US009965376B1

(12) United States Patent
Mola

(10) Patent No.: US 9,965,376 B1
(45) Date of Patent: May 8, 2018

(54) SPECULATIVE REPLAY OF EXECUTABLE CODE

(71) Applicant: MICROSOFT TECHNOLOGY LICENSING, LLC, Redmond, WA (US)

(72) Inventor: Jordi Mola, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days. days.

(21) Appl. No.: 15/400,552

(22) Filed: Jan. 6, 2017

(51) Int. Cl.
*G06F 11/36* (2006.01)

(52) U.S. Cl.
CPC ...... *G06F 11/3664* (2013.01); *G06F 11/3636* (2013.01); *G06F 11/3688* (2013.01)

(58) Field of Classification Search
CPC .................................................. G06F 11/3636
USPC ....................................................... 717/125
See application file for complete search history.

(56) References Cited

U.S. PATENT DOCUMENTS

| | | | | |
|---|---|---|---|---|
| 6,804,814 B1 * | 10/2004 | Ayers | ................... | G06F 11/3624 714/E11.209 |
| 6,981,243 B1 * | 12/2005 | Browning | ........... | G06F 11/3664 714/E11.207 |
| 7,836,430 B2 * | 11/2010 | Shebs | ..................... | G06F 11/36 717/124 |
| 7,877,630 B1 | 1/2011 | Favor et al. | | |
| 8,136,096 B1 * | 3/2012 | Lindahl | ............... | G06F 11/3636 714/45 |
| 8,271,955 B1 * | 9/2012 | Lindahl | ............... | G06F 11/3656 714/45 |
| 8,423,965 B2 | 4/2013 | Goel et al. | | |
| 9,122,601 B2 | 9/2015 | Lindo et al. | | |
| 9,372,781 B2 | 6/2016 | Brunkhorst et al. | | |
| 9,645,913 B2 * | 5/2017 | Geist | ................... | G06F 11/3664 |
| 2008/0077780 A1 | 3/2008 | Zingher | | |
| 2008/0155342 A1 * | 6/2008 | O'Callahan | ......... | G06F 11/3636 714/38.14 |

(Continued)

OTHER PUBLICATIONS

Bil Lewis; "Debugging Backwards in Time"; Fifth Int. Workshop on Automated and Algorithmic Debugging (AADEBUG2003); Sep. 2003 (Year: 2003).*

(Continued)

*Primary Examiner* — Qing Chen
*Assistant Examiner* — Clint Thatcher
(74) *Attorney, Agent, or Firm* — Workman Nydegger

(57) ABSTRACT

Performing a speculative replay of code execution. Embodiments include replaying trace data comprising a trace data stream that represents execution of one or more executable entities, including storing first runtime state of replaying the trace data in a first replay data structure. During replay, a first point of interest in the executable entities is encountered. Based on encountering the first point of interest, replay of the trace data is ceased, and a user interface presents a portion of the first runtime state. While presenting the portion of runtime state, the trace data is speculatively replayed. Speculative replay includes automatically selecting a second point of interest in the executable entities, creating a second replay data structure from the first replay data structure, and replaying the trace data until encountering the second point of interest, including storing second runtime state of replaying the trace data in the second replay data structure.

20 Claims, 6 Drawing Sheets

(56) References Cited

U.S. PATENT DOCUMENTS

| | | | |
|---|---|---|---|
| 2008/0295114 A1* | 11/2008 | Argade | G06F 9/485 |
| | | | 719/320 |
| 2014/0173569 A1* | 6/2014 | Krauss | G06F 11/3664 |
| | | | 717/125 |
| 2015/0378870 A1 | 12/2015 | Marron et al. | |
| 2016/0292061 A1* | 10/2016 | Marron | G06F 11/362 |

OTHER PUBLICATIONS

Bil Lewis; "Omniscient Debugging"; Lambda CS website (lambdacs.com) [Full URL in Ref.] as captured by the Wayback Machine Internet Archive (archive.org) on Aug. 28, 2011 (Year: 2011).*

Khoo, et al., "Expositor: Scriptable Time-Travel Debugging with First-Class Traces", In Proceedings of the International Conference on Software Engineering, May 18, 2013, pp. 352-361.

King, et al., "Debugging Operating Systems With Time-Traveling Virtual Machines", In Proceedings of USENIX Annual Technical Conference, Apr. 10, 2005, pp. 1-15.

Burg, et al., "Interactive Record/Replay for Web Application Debugging", In Proceedings of the 26th annual ACM Symposium on User Interface Software and Technology, Oct. 8, 2013, 11 pages.

Khanse, Anand, "Microsoft Time Travel Tracing Diagnostic Tool", http://www.thewindowsclub.com/microsoft-time-travel-tracing-diagnostic, Published on: Jul. 21, 2013, 5 pages.

\* cited by examiner

SPECULATIVE REPLAY OF EXECUTABLE CODE

BACKGROUND

When writing code during the development of software applications, developers commonly spend a significant amount of time "debugging" the code to find runtime errors in the code. In doing so, developers may take several approaches to reproduce and localize a source code bug, such as observing behavior of a program based on different inputs, inserting debugging code (e.g., to print variable values, to track branches of execution, etc.), temporarily removing code portions, etc. Tracking down runtime errors to pinpoint code bugs can occupy a significant portion of application development time.

Many types of debugging applications ("debuggers") have been developed in order to assist developers with the code debugging process. These tools offer developers the ability to trace, visualize, and alter the execution of computer code. For example, debuggers may visualize the execution of code instructions, may present variable values at various times during code execution, may enable developers to alter code execution paths, and/or may enable developers to set "breakpoints" in code (which, when reached during execution, causes execution of the code to be suspended), among other things.

An emerging form of debugging applications enable "time travel," "reverse," or "historic" debugging, in which execution of a program is recorded/traced by a trace application into one or more trace files, which can be then be used to replay execution of the program for forward and backward analysis. For example, "time travel" debuggers can enable a developer to set forward breakpoints (like conventional debuggers) as well as reverse breakpoints.

However, due to the need to replay code execution, "time travel" debuggers can exhibit poor responsiveness. For example, there may be a significant delay between the time that a user issues a debugging operation (e.g., single step forward/backward, step over forward/backward, go forward/backward) and the "time travel" debugger "hits" the breakpoint and presents the results to the user, since the debugger needs to perform a trace replay of potentially billions of instructions in response to the user input.

BRIEF SUMMARY

At least some embodiments described herein perform a speculative replay of a trace of executable code while concurrently presenting results of encountering a point of interest during a user-requested replay at a user interface. In particular, while presenting program runtime state at the encountered point of interest, embodiments predict one or more speculative points of interest (or one or more debugging operations that would imply the speculative point(s) of interest) that the user may interested in next, and perform at least one speculative replay of the executable code until a speculative point of interest is encountered. As part of the speculative replay, runtime data is recorded in a data structure that is separate from one used during normal replay. If the next user-selected point of interest/operation matches a predicted point of interest/operation, runtime results are quickly presented at the user interface from the separate data structure, rather than needing to perform the requested debugging operation while the user waits.

By performing speculative replay, the embodiments described herein enable a computer system to substantially fully utilize processor resources (i.e., by using spare processor cycles for speculative replay instead of idling while waiting for user input), and to provide a responsive debugging user interface that often has replay results ready prior to a user request for those results being received.

In an embodiment, performing a speculative replay of code execution comprises replaying trace data comprising one or more trace data streams that represent execution of one or more executable entities, including storing first runtime state of replaying the trace data in one or more first replay data structures. During replay of the trace data, a first point of interest in the one or more executable entities is encountered. Based at least on encountering the first point of interest, replay of the trace data is ceased, and a user interface presents at least a portion of the first runtime state stored in the one or more first replay data structures. While presenting the portion of the first runtime state at the user interface, the trace data is speculatively replayed. The speculative replay includes automatically selecting a second point of interest in the one or more executable entities, creating one or more second replay data structures based on the one or more first replay data structures, and replaying the trace data until encountering the second point of interest. Second runtime state of replaying the trace data is stored in the one or more second replay data structures.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

At least some embodiments described herein perform a speculative replay of a trace of executable code while concurrently presenting results of encountering a point of interest during a user-requested replay at a user interface. In particular, while presenting program runtime state at the encountered point of interest, embodiments predict one or more speculative points of interest (or one or more debugging operations that would imply the speculative point(s) of interest) that the user may interested in next, and perform at least one speculative replay of the executable code until a speculative point of interest is encountered. As part of the speculative replay, runtime data is recorded in a data structure that is separate from one used during normal replay. If the next user-selected point of interest/operation matches a predicted point of interest/operation, runtime results are quickly presented at the user interface from the separate data structure, rather than needing to perform the requested debugging operation while the user waits.

By performing speculative replay, the embodiments described herein enable a computer system to substantially fully utilize processor resources (i.e., by using spare processor cycles for speculative replay instead of idling while waiting for user input), and to provide a responsive debugging user interface that often has replay results ready prior to a user request for those results being received.

Figure 1:
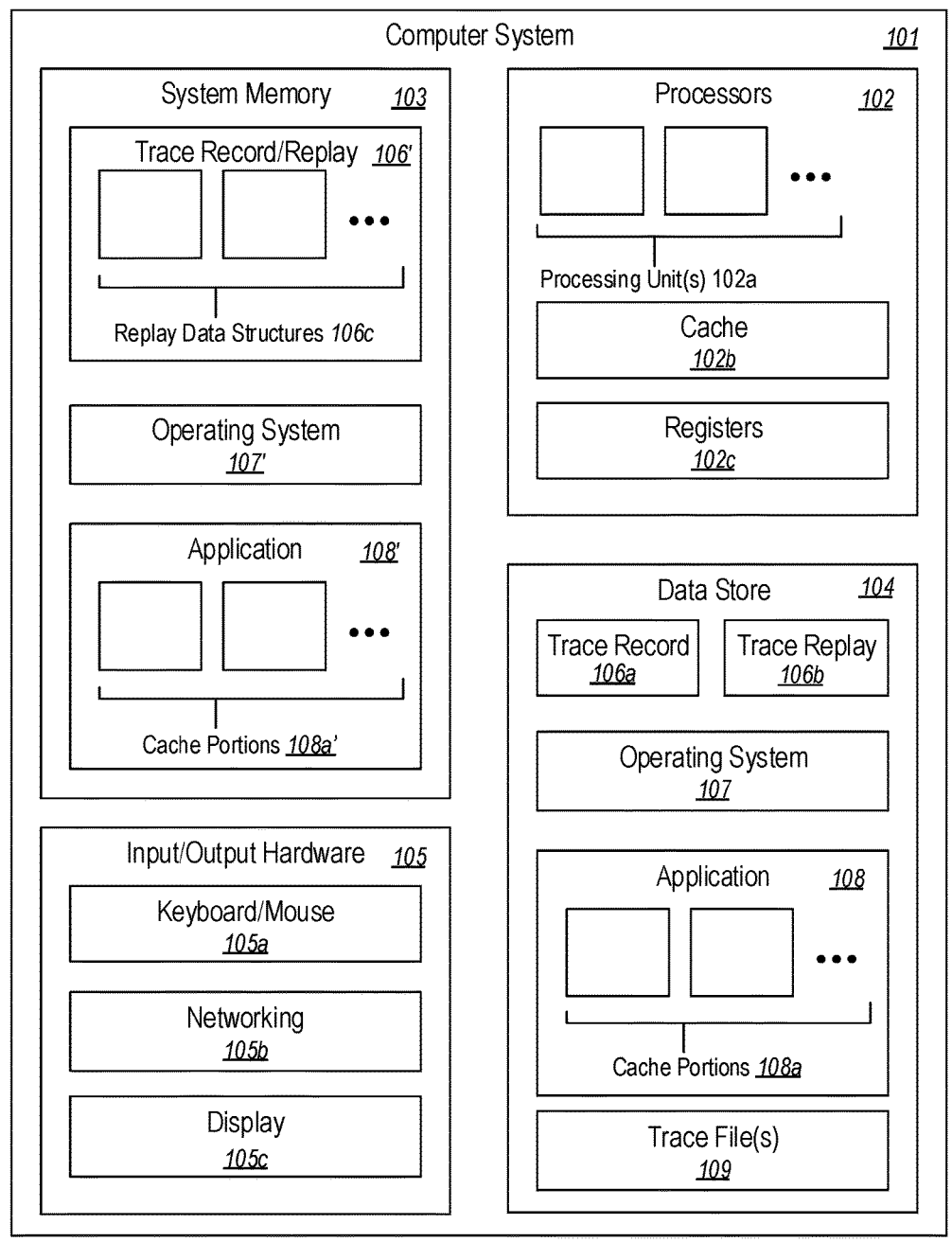
FIG. 1 illustrates an example computing environment that facilitates speculative replay of program code.

To the accomplishment of the foregoing, FIG. 1 illustrates an example computing environment 100 that facilitates speculative replay of program code. As depicted, embodiments may comprise or utilize a special-purpose or general-purpose computer system 101 that includes computer hardware, such as, for example, one or more processors 102, system memory 103, one or more data stores 104, and/or input/output hardware 105 (e.g., such as depicted keyboard/mouse hardware 105a, networking hardware 105b, and display device 105c).

Embodiments within the scope of the present invention include physical and other computer-readable media for carrying or storing computer-executable instructions and/or data structures. Such computer-readable media can be any available media that can be accessed by the computer system 101. Computer-readable media that store computer-executable instructions and/or data structures are computer storage devices. Computer-readable media that carry computer-executable instructions and/or data structures are transmission media. Thus, by way of example, and not limitation, embodiments of the invention can comprise at least two distinctly different kinds of computer-readable media: computer storage devices and transmission media.

Computer storage devices are physical hardware devices that store computer-executable instructions and/or data structures. Computer storage devices include various computer hardware, such as RAM, ROM, EEPROM, solid state drives ("SSDs"), flash memory, phase-change memory ("PCM"), optical disk storage, magnetic disk storage or other magnetic storage devices, or any other hardware device(s) which can be used to store program code in the form of computer-executable instructions or data structures, and which can be accessed and executed by the computer system 101 to implement the disclosed functionality of the invention. Thus, for example, computer storage devices may include the depicted system memory 103, the depicted data store 104 which can store computer-executable instructions and/or data structures, or other storage such as on-processor storage, as discussed later.

Transmission media can include a network and/or data links which can be used to carry program code in the form of computer-executable instructions or data structures, and which can be accessed by the computer system 101. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media. For example, the input/output hardware 105 may comprise networking hardware 105b (e.g., a hard-wired or wireless network interface module) that connects a network and/or data link that can be used to carry program code in the form of computer-executable instructions or data structures.

Further, upon reaching various computer system components, program code in the form of computer-executable instructions or data structures can be transferred automatically from transmission media to computer storage devices (or vice versa). For example, computer-executable instructions or data structures received over a network or data link can be buffered in RAM within networking hardware 105b, and then eventually transferred to the system memory 103 and/or to less volatile computer storage devices (e.g., data store 104) at the computer system 101. Thus, it should be understood that computer storage devices can be included in computer system components that also (or even primarily) utilize transmission media.

Computer-executable instructions comprise, for example, instructions and data which, when executed at the processor(s) 102, cause the computer system 101 to perform a certain function or group of functions. Computer-executable instructions may be, for example, binaries, intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

As illustrated, the data store 104 can store computer-executable instructions and/or data structures representing application code such as, for example, a trace record component 106a, a trace replay component 106b, an operating system 107, and an application 108 including portions of executable code 108a. The data store 104 can also store other types of data, such as one or more trace file(s) 109. When application code is executing (e.g., using the processor(s) 102), the system memory 103 can store corresponding runtime data, such as runtime data structures, computer-executable instructions, etc. Thus, FIG. 1 illustrates the system memory 103 as including runtime record/replay data 106' (including replay data structures 106c), runtime operating system data 107', and runtime application data 108a' (including runtime executable code data 108a').

The trace record component 106a is usable to trace execution of an application, such as application 108 including its executable code portions 108a, and to store trace data in the trace file(s) 109. In some embodiments, the trace record component 106a is a standalone application, while in other embodiments it is integrated into another software component, such as the operating system 107, a hypervisor, a debugging suite, etc. The trace record component 106a may also exist at an entirely different computer system. Thus, the trace record component 106a may trace execution of code at another computer system. Then, the trace file(s) 109 resulting from that tracing can be transferred (e.g., using the networking hardware 105b) to the computer system 101 for replay be the trace replay component 106b. While the trace file(s) 109 are depicted as being stored in the data store 104, they may also be recorded exclusively or temporarily in the system memory 103, or at some other storage device.

FIG. 1 also includes a simplified representation of the internal hardware components of the processor(s) 102. As illustrated, each processor 102 includes a plurality of processing units 102a. Each processing unit may be physical (i.e., a physical processor core) and/or logical (i.e., a logical core presented by a physical core that supports hyper-threading, in which more than one application thread executes at the physical core). Thus, for example, even though the processor 102 may in some embodiments include only a single physical processing unit (core), it could include two or more processing units 102a presented by that single physical processing unit.

Each processing unit 102a executes processor instructions that are defined by applications (e.g., trace record component 106a, trace replay component 106b, operating system 107, application code portions 108a, etc.), and which instructions are selected from among a predefined processor instruction set architecture. The particular instruction set architecture of each processor 102 varies based on processor manufacturer and processor model. Common instruction set architectures include the IA-64 and IA-32 architectures from INTEL, INC., the AMD64 architecture from ADVANCED MICRO DEVICES, INC., and various Advanced RISC Machine ("ARM") architectures from ARM HOLDINGS, PLC, although a great number of other instruction set architectures exist and can be used by the present invention. In general, an "instruction" is the smallest externally-visible (i.e., external to the processor) unit of code that is executable by a processor.

Each processing unit 102a obtains processor instructions from a shared processor cache 102b (i.e., shared by the processing units 102a), and executes the processor instructions based on data in the shared cache 102a, based on data in registers 102c, and/or without input data. In general, the shared cache 102b is a small amount (i.e., small relative to the typical amount of system memory 103) of random-access memory that stores on-processor copies of portions of the system memory 103. For example, when executing the executable code portions 108b, the shared cache 102b contains portions of the runtime executable code data 108b'. If the processing unit(s) 102a require data not already stored in the shared cache 102b, then a "cache miss" occurs, and that data is fetched from the system memory 103 (potentially evicting some other data from the shared cache 102b). The registers 102c are hardware based storage locations that are defined based on the instruction set architecture of the processors(s) 102.

Figure 2:
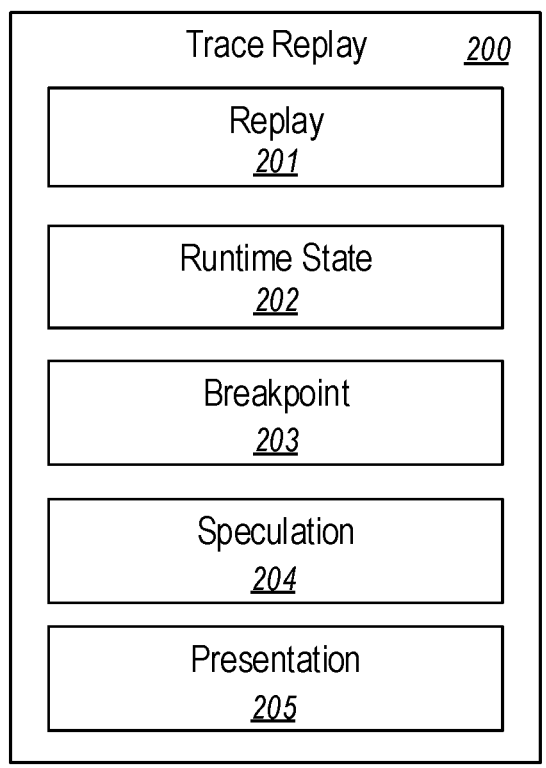
FIG. 2 illustrates an example trace replay component.

FIG. 2 illustrates an example trace replay component 200, such as one corresponding to the trace replay component 106b of FIG. 1. As depicted in FIG. 2, the trace replay component 200 can include a number of sub-components, such as, for example, a replay component 201, a runtime state component 202, a breakpoint component 203, a speculation component 204, and/or a presentation component 205. The depicted identity and arrangement of sub-components are for ease in description, but one of ordinary skill in the art will recognize that the particular identity and number of sub-components of the trace replay component 200 can vary greatly based on implementation.

The replay component 201 is configured to replay trace files, such as trace file 109 by executing the code of the executable entity upon which the trace file 109 is based at the processor(s) 102, while supplying that code with traced data (e.g., register values, memory values, etc.) from the trace file 109 at appropriate times. This may include parsing the trace file 109 in order to identify one or more data streams that represent execution of one or more executable entities. The types and complexity of the trace files 109 that can be used by the embodiments herein can take a variety of forms, depending on implementation of the trace record component 106a and/or the trace replay component 106b used. Two different example trace files are presented hereinafter in connection with FIGS. 3 and 4.

The replay component 201 can be configured to replay traces both forwards and backwards. To hit a forward breakpoint or other point of interest when replaying an executable entity, the replay component uses a trace file 109 to replay executable code of the entity from a designated point in execution of the entity forward, until a code element of interest is encountered.

To hit a reverse breakpoint or other point of interest, the replay component 201 uses a trace file 109 to perform a forward replay in a section starting a first key frame that is prior to and closest to the designated point in the trace and ending at the designated point, to attempt to encounter the code element of interest between the first key frame and the designated point. If the code element of interest is not encountered between the first key frame and the designated point, the replay component 201 then performs a forward replay in a section starting a second key frame that is prior to the first key frame and ending at the first key frame to attempt to encounter the code element of interest between the first and second key frames. This continues until the code element of interest is reached. When the code element is encountered in a section, replay still needs continue until the end of the section, since the code element could be encountered again in the section, and the replay component 201 would typically return the encounter that is closest to the designated point (which would be the last encounter in the section).

The runtime state component 202 is configured to store runtime data generated as part of replay of the trace file 109 by the replay component 201. For example, FIG. 1 illustrates that the system memory 103 includes replay data structures 106c that store runtime data generated during trace replay. Example data stored by the replay data structures 106c may include runtime memory values (e.g., stack, heap, etc.), register values, bookkeeping data used by the replay component 106b, etc. The exact form of these data structures may vary depending on implementation of the trace record component 106a and/or the trace replay component 106b. For example, a replay data structure 106c may comprise a snapshot of all addressable memory used by one or more executable entities being replayed, a cache that stores memory values written to by one or more executable entities during replay, etc. As discussed in more detail hereinafter, the runtime state component 202 is also configured to create one or more copies of replay data structures 106c for use as part of speculative replay execution. These may be complete copies, differential copies, copy-on-write data structures, etc.

The breakpoint component 203 is configured to identify the encounter of a point of interest (e.g., a breakpoint) comprising a code element of interest in of at least one executable entity being replayed. The point of interest may be user-specified (e.g., through the presentation component 205), or may be automatically determined by the speculation component 204, as discussed later.

In general, a user-specified point of interest comprises a user-specified code element (e.g. variable, function, line of source code, executable instruction, etc.) in an executable entity, upon which the user would like code replay to "break" or stop when reached. A user-specified point of interest may be specified expressly (e.g., based on user input specifically identifying a particular code element), or may be inferred based on a user-selected debugger operation (e.g., a code element may be identified based on the debugger operation selected by a user, such as single step forward/backward, step over forward/backward, go forward/backward, etc.). When a point of interest is encountered during replay by the replay component 201, the breakpoint component 203 causes the replay component 201 to cease replay at the point of interest, and to initiate execution of the speculation component 204 and/or the presentation component 205.

The speculation component 204 is configured to predict one or more points of interest that a user may likely be interested in next, based on past user input. For example, the speculation component 204 may automatically identify one or more speculative points of interests upon its initiation by the breakpoint component 203 when the breakpoint component 203 encounters a point of interest (whether that be a user-specified point of interest or a prior predicted point of interest). Additionally or alternatively, the speculation component 204 may identify one or more speculative points of interests based merely on user input specifying a point of interest (e.g., based on its initiation by the presentation component 207 upon the presentation component 207 receiving the user input, and prior to the breakpoint component 203 actually encountering the point of interest). The speculation component 204 may directly identify a speculative point of interest (e.g., in reference to a specific code element), or may indirectly identify a point of interest based on an anticipated next debugger operation (e.g., identify a code element that would be encountered after a step forward operation).

The speculation component 204 can predict likely next point(s) of interest based on immediate and/or long-term prior inputs from a user. In some embodiments, the speculation component 204 maintains in the data store 104 and/or the system memory 103 a user input log storing the past inputs of a user. Then, the speculation component 204 can develop a behavioral model from the user input log.

In some embodiments, the behavioral model identifies frequent patterns in input from a user. For example, the behavioral model may identify that the user frequently performs different series of operations such as a step over backward operation followed by a series of single step forward and/or backward operations, a go forward operation followed by a single step forward and/or backward operation, etc. In additional or alternative embodiments, the behavioral model identifies the probability of the user choosing each available operation after a given operation (or even a series of operations). For example, for a "single step forward" operation, the behavioral model may identify the probability of the user next choosing each of: a "single step forward" operation, a "single step backward" operation, a "step over forward" operation, a "step over backward" operation, a "go forward" operation, and/or a "go backward" operation, among others.

In some embodiments, the speculation component 204 applies various weightings in the behavioral model, such a weighting that gives more recent user inputs a higher weight than less recent user inputs, a weighting that gives more frequently used operations a higher overall weighting than less frequently used operations, etc.

In some embodiments, the speculation component 204 weights data in the behavioral model against an anticipated amount of work that is to be performed to reach a speculative point of interest. For example, in general, a step over operation is likely to cause a greater amount of processing (e.g., by the replay component 201) than a single step operation. This is because a single step operation typically causes a small number (e.g., typically a single-digit number) of processor instructions to be replayed, whereas a step over operation could potentially cause a great number (even numbering into the millions or billions) of processor instructions to be replayed—due to the processing of entire functions, including functions called by those functions. In some embodiments, the speculation component 204 may predict the amount of replay processing a given operation may cause based on analysis of code of the executable unit being replayed.

In most debuggers, less replay processing intense operations such as a single step can often be replayed while the user waits for a result, without a delay that is noticeable by the user. In contrast, more replay processing intense operations such as a step over may result in a noticeable delay to the user if the processing is performed while the user is waiting for the result. Thus, in some embodiments, speculation component 204 weights operations that could cause a significant amount of replay processing such that they are predicted in favor of operations that typically cause a smaller amount of replay processing to be performed—so that the results of these operations are already available if the user chooses them. By ensuring that the results of more replay intense operations are already available when the user chooses those operations (verses the results of less replay intense operations) the speculation component 204 can often improve overall responsiveness during replay.

In some embodiments, speculation component 204 also uses a global behavioral model that is generated based on a statistical analysis user inputs by a plurality of users during debugging sessions. The data in this global model can then be weighted against the data in a more user-specific model. A global model may be generated based on multiple users at the computer system 101, or based on multiple users a multiple computer systems. In some embodiments, software developer distributes the global model as part of the trace replay component 200.

In some embodiments, the speculation component 204 predicts a speculative point of interest based at least in part on past user interest in the code being replayed. For example, if a user has previously set a breakpoint on a particular variable or line of code, the speculation component 204 may anticipate a point of interest comprising that particular variable or line of code and/or choose an anticipated next debugger operation based at least in part on choosing an operation that would cause that particular variable or line of code to be replayed.

When a point of interest is encountered by the breakpoint component 203, the presentation component 407 is configured to present information relevant to the point of interest at a user interface, including, for example, presenting program state such as register values, memory values, etc. when the point of interest was encountered. The presentation component 407 is also configured to facilitate receipt of user input, such as points of interests, including particular code elements and/or debugger operations, and to initiate execution of the replay component 201 to replay executable code based on the input. As alluded to previously, the presentation component 407 may also initiate execution of the speculation component 204 upon receipt of user input, so that the speculation component 204 can begin identification of one or more next anticipated points of interest even before replay to a user-selected point of interest has commenced, or while the replay is in progress.

As mentioned briefly, the trace file(s) 109 can take a variety of forms, depending on implementation of the trace record component 106a and/or the trace replay component 106b. In general, the trace file(s) 109 store sufficient information to reproduce execution of an executable entity (e.g., an application thread) by supplying traced runtime state data to executable code (e.g., code portions 108a) of the executable entity, generally at the processor instruction level. Thus, for example, trace file(s) 109 may include initial state (e.g., initial processor register values, initial memory values, etc.) that existed when an entity started execution, as well as state generated and/or encountered during execution (e.g., register values read and/or written, memory values read and/or written, etc.).

Figure 3:
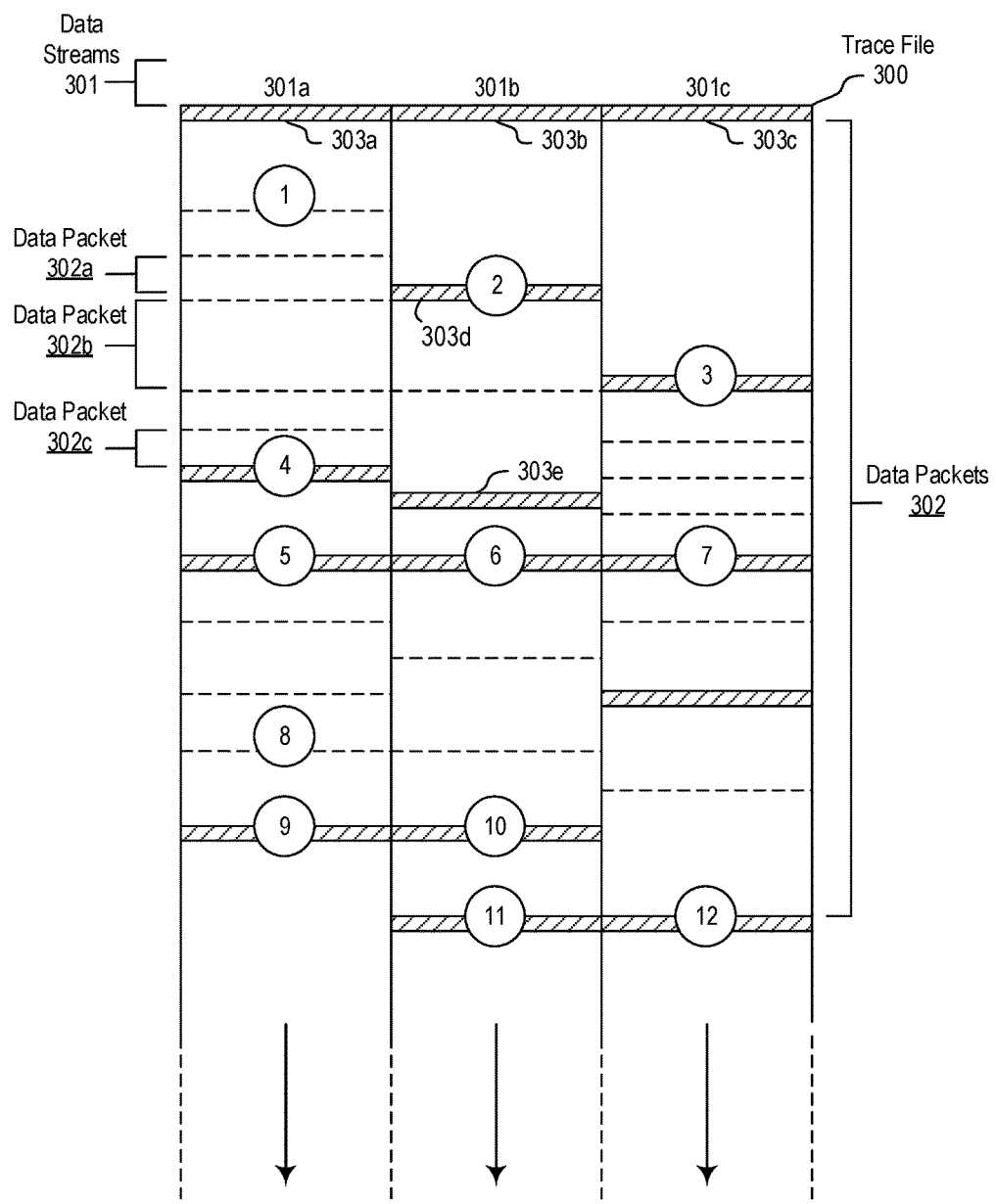
FIG. 3 illustrates a first example trace file.

FIG. 3 illustrates an example of a trace file 300 that independently records execution of each of a plurality of executable entities (e.g., different threads, different executable entities corresponding to different portions of executable code 108a of the application 108, etc.) that are executing in parallel. For example, the trace file 300 represents the execution of three threads of an application that executed in parallel at multiple processing units 102a or processors 102. In FIG. 3, the trace file 300 includes a separate data stream 301 for each processing unit 103a—and thus for each executable entity of the application. Thus, the trace file 300 includes three data streams 301a-301c, but the trace file 300 could include any number of data streams 301 depending on a number of processing units 102a available at the computer system 101 (whether they be in a single processor 102 or multiple processors 102) and/or a number of executable entities created by the application 108.

The data streams 301 may be included in a single file, or may each be stored in different files. Each data stream 301 includes data packets 302 storing trace data that is usable by the trace replay component 106b to reproduce execution of the corresponding executable entity, by supplying appropriate recorded state data (e.g., register values, memory addresses and values, etc.) to executable code of the executable entity at appropriate times. Thus, using the information in the data streams 301, and using the actual executable code whose execution was traced, a full reproduction of execution of that code can be reproduced.

In FIG. 3, the data packets 302 are depicted as being separated by broken lines, and/or by key frames (which are discussed later). Thus, for example, three of the data packets in data stream 301a are specifically identified as data packets 302a-302c. As depicted, individual data packets 302 may be of differing sizes, depending on trace file implementation and on the particular data stored in each packet. Example data that may be included in a data packet includes information for identifying a code instruction executed, register values provided to that code instruction, memory addresses/values read, the side effects (e.g., resulting register values) of executing the code instruction, etc.

Using the format of trace file 300, the trace record component 106a records each data stream 301 independently during parallel execution of the code being traced. As such, the timing of the executable events recorded by the trace record component 106a into data packets in one data stream is generally independent from the timing of the events recorded by the trace recoding component 106a into data packets in another data stream. Thus, the replay component 106b can generally replay each data stream 301 independently.

The trace file 300 also stores sequencing events that record the timing and sequence of execution of certain events that are "orderable" across the data streams 301. In some embodiments, these orderable events are recorded using a sequencing number, comprising a monotonically incrementing number, which is guaranteed to not repeat. For example, the trace file 300 of FIG. 3 includes twelve sequencing numbers (depicted as circled numerals 1-12), each corresponding to the occurrence of different orderable events across data streams 301a-301c. Orderable events may be defined according to a "trace memory model," which is used to identify how to store interactions across executable entities, such as threads (e.g., based on how the threads interact through shared memory, their shared use of data in the shared memory, etc.). Depending on implementation, a trace memory model may be weaker or stronger than a memory model used by the processor 102. The trace memory model used may be a memory model defined by a programming language used to compile code (e.g., C++ 14), or some other memory model defined for purposes of tracing.

The trace file 300 can also include key frames, which are depicted as shaded lines (e.g., such as particularly identified key frames 301a-303e). A key frame is a type of data packet that stores sufficient information to replay execution of an executable entity from the time of the key frame onward. For example, a key frame may store values for all relevant processor registers, information necessary to reproduce memory values from that point onward, etc. In FIG. 3, there is a key frame at the beginning of each trace data stream 301 (i.e., key frames 303a-303c). These key frames may represent state at the beginning of execution of each executable entity. Any number of key frames may be saved at any point in a data stream 301, and need not occur at the same time across data streams. For example, among the key frames depicted in FIG. 3 are a key frame 303d occurring in connection with a sequencing number, and a key frame 303e occurring at an arbitrary point in a data stream.

Using key frames, the trace replay component 106b is enabled to initiate replay of each trace data stream 301 at various points. Additionally, using key frames and/or orderable events, initiation of replay of different trace data streams can be performed in parallel. Key frames are the basis for performing an efficient reverse replay. For example, when selecting sections of a trace prior a designated point in execution of the entity, for attempting to encounter a code element of interest using a forward replay in the section, the replay component 201 can use sections that begin with a key frame. Thus, the more key frames in a data stream 301, the more granular the sections used for reverse replay can be. To this end, in some embodiments, the replay component 201 inserts additional key frames into the trace file 300 during replay (whether that be normal and/or speculative), or stores them in replay data structures 106c, so that these additional key frames can be used for a reverse replay later, if needed.

Figure 4:
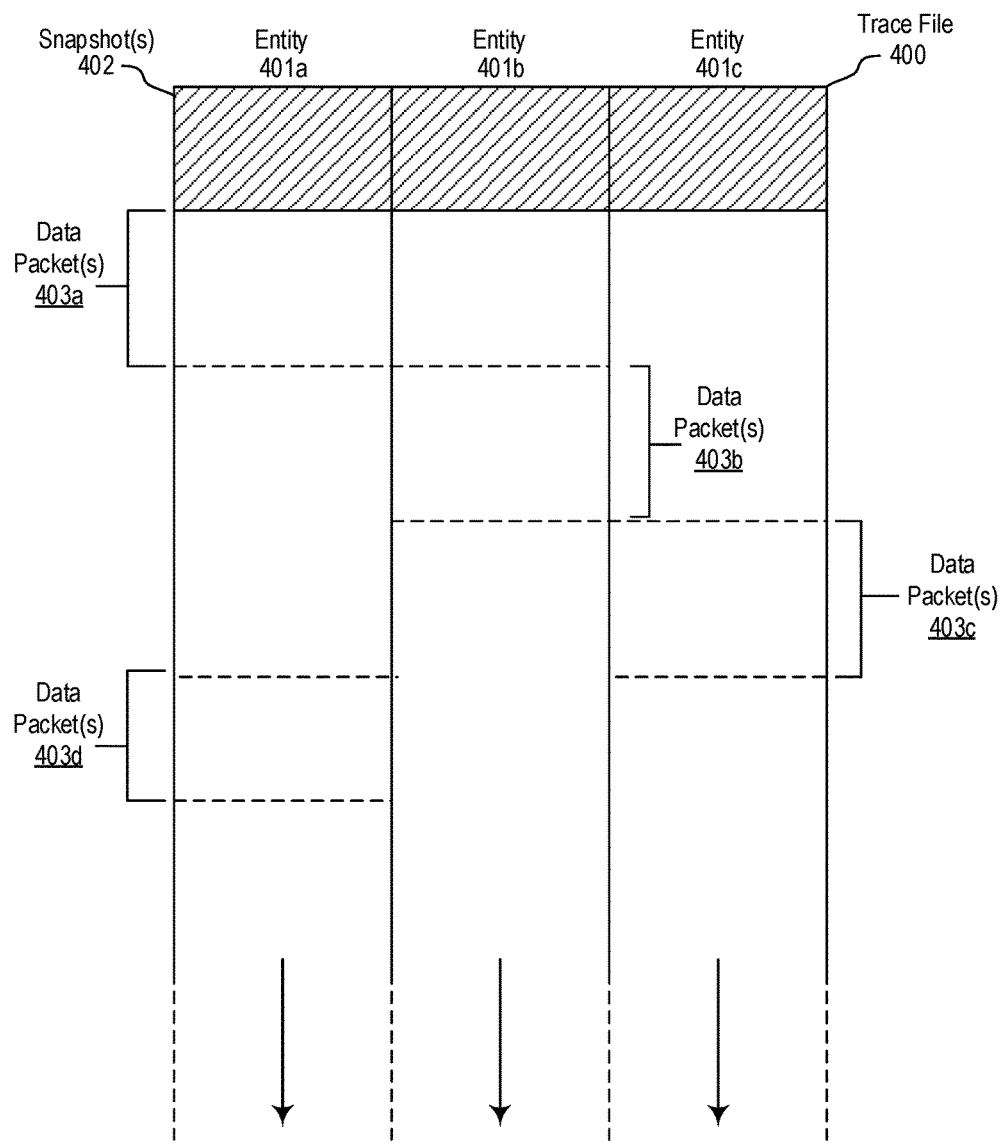
FIG. 4 illustrates a second example trace file.

FIG. 4 illustrates another example of a trace file 400 that records execution of executable entities as if they were executed at one single-threaded processing unit 102a. In particular, rather than recording the execution of a plurality of executable entities independently, when recording trace file 400 the trace record component 106*a* records execution of executable entities one-at-a-time as they share time on a processing unit. Thus, the trace file 400 conceptually represents a single data stream, which stores data packets for three executable entities (e.g., threads) 401*a*-401*c*. In particular, the trace file 400 illustrates that during execution of entity 401*a*, the trace file records one or more data packet(s) 403*a* tracing execution of entity 401*a*; then, during execution of entity 401*b*, the trace file records one or more data packet(s) 403*b* tracing execution of entity 401*b*. Similarly, data packet(s) 403*c* are recorded when entity 401*c*, executes, and then additional data packet(s) 403*d* are recorded for entity 403*a* when it is again executed. Since the trace file 400 records execution of these entities in a single-threaded manner, replay is also typically performed in a largely single-threaded manner.

FIG. 4 also illustrates that the trace file 400 can also include one or more snapshot(s) 402, such as a snapshot at the beginning of execution that records processor registers, memory values, etc. The snapshot(s) 402 are visually illustrated as being thicker than the key frames of FIG. 3, to illustrate that different types of trace files can store snapshot data is different manners. For example, the snapshot(s) 402 in FIG. 4 may be a "fat" snapshot that stores a full copy of memory that is addressable by an executable entity. By contrast, a key frame (e.g., 303*a*-330*c*) in FIG. 3 may be a more "thin" snapshot that stores a much smaller cache that records data that is read by executable entities, rather than all addressable memory.

Since the "fat" snapshot(s) 402 of FIG. 4 may occupy a significant amount of storage, the snapshot(s) 402 of FIG. 4 may be stored far less frequently than the more "thin" key frames (e.g., 303*a*-330*c*) of FIG. 3, or may be stored only at the beginning of a trace data stream. As such, when replaying a trace file 109 using "fat" snapshots, the replay component 200 may have much less granular trace sections available for use in a reverse replay than when repaying a trace file 108 using more "thin" key frames.

Figure 5:
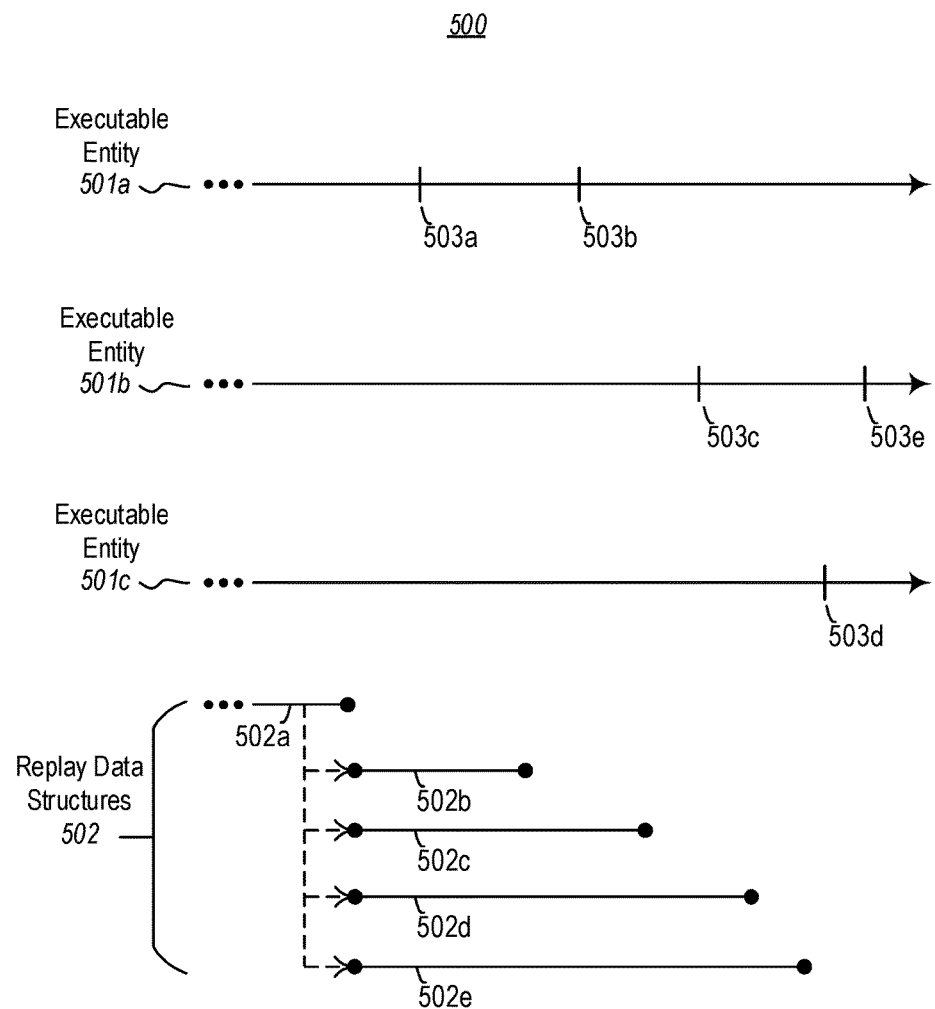
FIG. 5 illustrates example timing diagram demonstrating speculative replay of an executable entity based on a trace file.

FIG. 5 illustrates an example timing diagram 500 demonstrating speculative replay of one or more executable entities based on a trace file. In particular, FIG. 5 illustrates a timeline of replay of executable entities 501*a*-501*c*. For example, in reference to FIGS. 2-4, the replay component 201 may be replaying execution of executable entities based on the trace files 300 or 400 of FIG. 3 or 4. During replay, the runtime state component 201 records runtime state to one or more replay data structures (e.g., 106*c* in FIG. 1). Thus, FIG. 5 references a replay data structure 502*a* as a line running along the timeline, symbolically indicating that the runtime state component 201 continuously stores runtime state (e.g., such as register values, memory values, etc.) into the replay data structure 502*a* during replay of executable entities 501*a*-501*c*.

While replay data structure 502*a* is shown for simplicity as a single line in FIG. 5, one of skill in the art will recognize that it could comprise a plurality of data structures, such as a different data structure corresponding to each executable entity. Also, while FIG. 5 depicts a plurality of executable entities being replayed, it will be appreciated that the principles described herein are applicable to replay of a single executable entity.

FIG. 5 illustrates a point of interest 503*a*, and line referencing the replay data structure 502*a* ending at that point in the timeline. For example, when the breakpoint component 203 encounters the point of interest 503*a* in the code of the executable unit, the breakpoint component 203 causes the replay component 201 to cease replay of the executable entities 501*a*-501*c*. The point of interest 503*a* could be a user-defined breakpoint, or a point of interest previously speculated based on a requested debugger operation (e.g., the instruction following a step forward, etc.), or some other common point of interest, such as the beginning or end of a trace, execution exceptions identified in the trace, modules loaded in the trace, etc. Upon encountering the point of interest 503*a*, the breakpoint component 203 also initiates execution of the speculation component 204 and/or the presentation component 205.

Using information stored in the replay data structure 502*a*, the presentation component 205 presents, at a user interface (e.g., using display 105*c*), runtime state information as it relates to execution of the executable entities 501*a*-501*c* at the time the point of interest 503*a* was encountered. For example, the presentation component 205 may present various runtime variable values, register values, memory values, etc. of the executable entities 501*a*-501*c* at the time point of interest 503*a* was encountered.

Concurrent with the presentation component 205 presenting the runtime state at the time point of interest 503*a* was encountered, the speculation component 204 initiates a speculative replay to one or more points of interest in the executable entities 501*a*-501*c* that the user may choose next based on prior input. Thus, while the user is engaged in consuming the data at the user interface for point of interest 503*a*, the speculation component 204 makes ready results for one or more speculative points of interest the user may likely be interested in next.

For example, in FIG. 5 the speculation component 204 has identified one speculative point of interest 503*b* in executable entity 501*a*, two speculative points of interest 503*c* and 503*e* in executable entity 501*b*, and one speculative point of interest 503*d* in executable entity 501*c* that the user is likely to be interested in. The speculation component 204 then causes the replay component 201 to begin replay to those points of interest—even though the user has not specifically requested them, and while the presentation component still presents results of having reached point of interest 503*a*. Thus, initiation of replay to these speculative points of interest is not visible to the user.

As shown in FIG. 5, the runtime state component 202 creates one or more additional replay data structures (i.e., 502*b*-502*e*) based on replay data structure 502*a*, which are used to store runtime state data for the speculative replay. For example, FIG. 5 shows a replay data structure 502*b* for storing runtime data for speculative replay to point of interest 503*b*, a replay data structure 502*c* for storing runtime data for speculative replay to point of interest 503*c*, etc. While FIG. 5 shows a different data structure for each speculative point of interest, it will be recognized that more or fewer data structures may be used. For example, a single data structure may be used to store runtime state related to replay all of the speculative points of interest 503*b*-503*e*, a different data structure may be used to store runtime state related to each executable unit 501*a*-501*c*, etc. As mentioned previously, these may be complete copies, differential copies, copy-on-write data structures, etc.

After new replay data structure(s) are created, the replay component 201 initiates a replay using these data structure(s) to reach the potential point(s) of interest 503*b*-503*e*. Thus, for example, FIG. 5 illustrates that the replay component 201 writes to replay data structure 502*b* until point of interest 503*b* is reached, writes to replay data structure 502*c* until point of interest 503*c* is reached, writes to replay data structure 502*d* until point of interest 503*d* is reached, etc.

The replay may be performed serially (i.e., replay to point of interest 503b, then to point of interest 503c, etc.), or in parallel (i.e., queue each of the points of interest for replay, and perform a parallel replay from the queue). In some embodiments, the different points of interest are prioritized by the speculation component 204, based for example, on one or more of the relative likelihood that the point of interest will be chosen (i.e., to prioritize replay of the most likely points of interest), the anticipated amount of processing to be performed to replay to the point of interest (e.g., to prioritize points of interest that will require the most amount of processing), etc.

Speculative execution can continue forward for any number of levels, with results accumulating. For example, the speculation component 204 can continue to identify further speculated points of interest (e.g., identify additional points of interest on executable entity 501a beyond point of interest 503b, additional points of interest on executable entity 501b beyond point of interest 503b, etc.) and the replay component 201 can continue to perform speculative replay to these additional points of interest. As replay proceeds to deeper levels the probability that a user will actually select those deep points of interest decreases, but it may be desirable to devote extra processor cycles to this processing nonetheless.

In some embodiments, the replay component 201 speculatively replays to the chosen points of interest until a next interaction by the user. Thus, the replay component 201 may cease the speculative replay when the user chooses a next debugger operation and/or express point of interest. If the replay component 201 has not completed speculative replay to each chosen point of interest, it may pause the replay to points of interest not reached, discard the replay of points of interest not reached (e.g., delete the corresponding replay data structure), etc.

Based on the user input, the trace replay component 200 can utilize one or more speculatively-created replay data structure(s) to present runtime data, discard one or more speculatively-created replay data structure(s) 502, and/or save one or more speculatively-created replay data structure(s) 502 for later use. For example, if the next point of interest identified by the user's input corresponds to point of interest 503c, the presentation component 205 may present runtime state using replay data structure 502c, and the runtime state component 202 may discard replay data structure 502b and save replay data structures 502d and 502e for later use (e.g., for use if the user next chooses point of interest 503e or 503d).

Of course, the runtime state component 202 may choose to save replay data structure 502b rather than discarding it, since the user may later choose point of interest 503b as a reverse breakpoint. It will be appreciated, however, that input specifying a new point of interest may cause re-evaluation of prior speculatively calculated answers (e.g., replay data structure 503b), since the new breakpoint may hit somewhere other than the prior-calculated position.

Since replay data structure 502c was already created when the user input was received, the presentation component 205 can present the state without any replay processing delay. The runtime state component 202 can also incorporate new data from runtime data structure 502c into replay data structure 502a, or discard replay data structure 502a and use runtime data structure 502c base data structure going forward.

Figure 6:
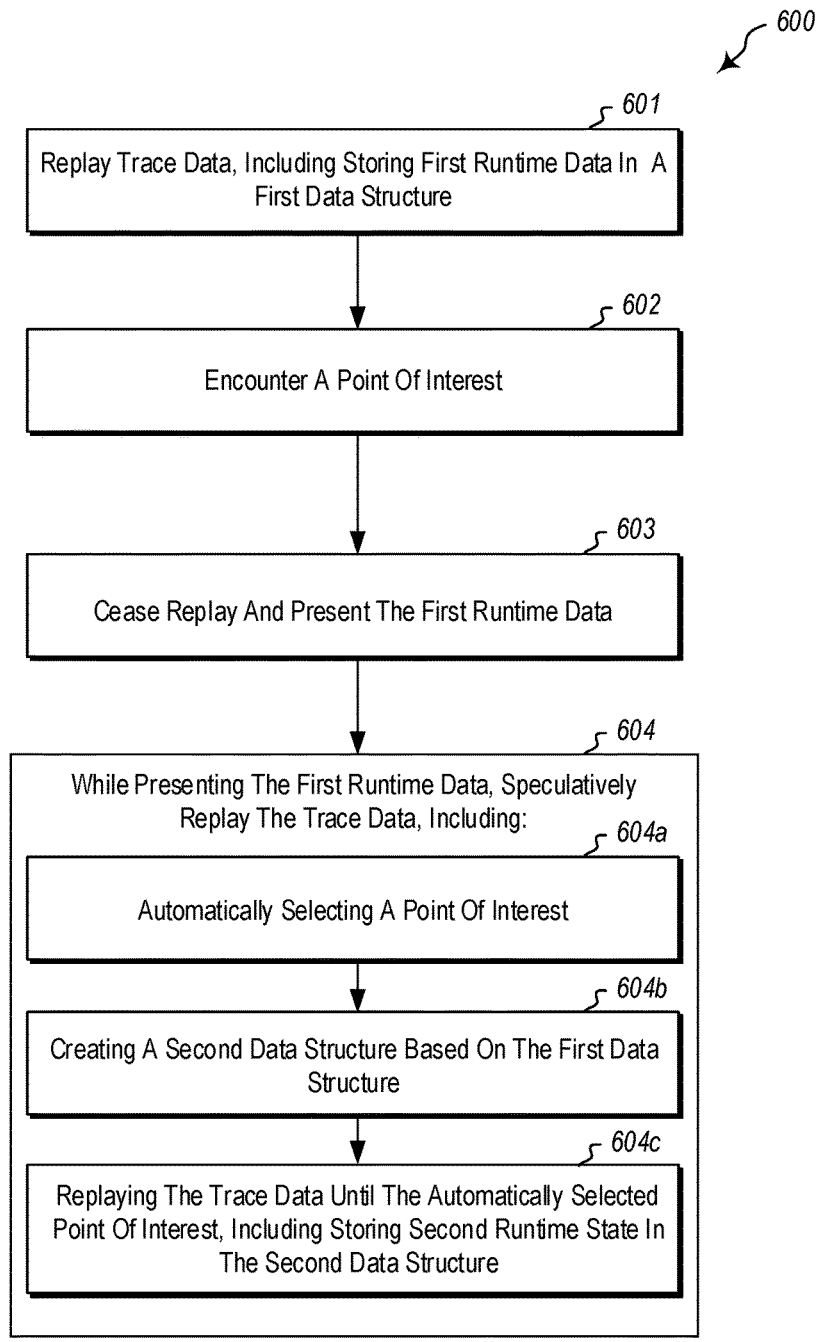
FIG. 6 illustrates a flowchart of an example method for performing a speculative replay of code execution.

In accordance with the foregoing, FIG. 6 illustrates flowchart of an example method 600 for performing a speculative replay of code execution. FIG. 6 is described in connection with the components and data described in connection with FIG. 1-5. While method 600 is illustrated as a series of acts, the particular ordering of the acts in the method 600 is not limited to the ordering shown.

As illustrated, method 600 includes an act 601 of replaying trace data, including storing first runtime data in a first data structure. Act 601 can comprise replaying trace data comprising one or more trace data streams that represent execution of one or more executable entities, including storing first runtime state of replaying the trace data in one or more first replay data structures. For example, during replay of trace file 300 or trace file 400 by the replay component 201, the runtime state component 202 can record first runtime state data in replay data structure 502a.

Method 600 also includes an act 602 of encountering a user-defined point of interest. Act 602 can comprise, during replay of the trace data, encountering a first point of interest in the one or more executable entities. For example, during replay of trace file 300 or trace file 400 by the replay component 201, the breakpoint component 203 can detect that a point of interest 503a in executable entity 501a has been encountered. As mentioned previously, the point of interest may be a user-defined point of interest or some other common point of interest.

Method 600 also includes an act 603 of ceasing replay and presenting the first runtime data. Act 603 can comprise, based at least on encountering the first point of interest, ceasing replay of the trace data, and presenting at a user interface at least a portion of the first runtime state stored in the one or more first replay data structures. For example, based on the breakpoint component 203 detecting that point of interest 503a in executable entity 501a has been encountered, the breakpoint component 203 can cause the replay component 201 to cease replay, and initiate execution of the presentation component 205. The presentation component 205 can then present a user interface at display 105c comprising runtime data obtained from replay data structure 502a.

Method 600 also includes an act 604 of, while presenting the first runtime data, speculatively replaying the trace data. Act 604 can comprise, while presenting the portion of the first runtime state at the user interface, speculatively replaying the trace data. For example, also based on the breakpoint component 203 detecting that point of interest 503a in executable entity 501a has been encountered, the breakpoint component 203 can also initiate execution of the speculation component 204, which causes a speculative replay to likely next points of interest while the runtime data obtained from replay data structure 502a is being presented at the user interface.

As illustrated, act 604 includes an act 604a of automatically selecting a point of interest. Act 604a can comprise automatically selecting a second point of interest in the one or more executable entities. For example, the speculation component 204 can identify one or more points of interest (e.g., 503b-503e) that a user may be interested in based on point of interest 503a (or the debugging operation the user chose to select point of interest 503a). The speculation component 204 can select the second point of interest based on one or more anticipated next debugger operations, based on prior user behavior. Thus, the one or more anticipated next debugger operations may be selected based on performing a statistical analysis of past debugger usage patterns. Debugger operations can include, for example, a single step forward operation, a single step backward operation, a step over forward operation, a step over backward operation, a go forward operation, a go backward operation, etc.

Act 604 also includes an act 604b of creating a second data structure based on the first data structure. Act 604b can comprise creating one or more second replay data structures based on the one or more first replay data structures. For example, the runtime state component 202 can create one or more replay data structures (e.g., 502b-502e) from replay data structure 502a. This may include copying replay data structure 502a, creating differential data structure storing differences between the first runtime state and the second runtime state, creating a copy-on-write data structure based on forking a thread corresponding to an executable entity, etc.

Act 604 also includes an act 604c of replaying the trace data until the automatically selected point of interest, including storing second runtime state in the second data structure. Act 604c can comprise replaying the trace data until encountering the second point of interest, including storing second runtime state of replaying the trace data in the one or more second replay data structures. For example, while the replay component 201 replays trace data until the one or more points of interest (e.g., 503b-503e) that a user may be interested in, the runtime state component 202 can store runtime data in the previously created replay data structures (e.g., 502b-502e).

Method 600 may also include receiving a user selection of the second point of interest, and presenting at the user interface at least a portion of the second runtime state stored in the one or more second replay data structures. For example, the presentation component 205 may receive at the keyboard/mouse 105a selection of point of interest 503c. Then, the presentation component 205 can immediately present runtime state from replay data structure 502c, rather than performing a replay to point of interest 503c while the user waits.

Method 600 may also include discarding the one or more first replay data structures. For example, upon selection of point of interest 503c, the runtime state component 202 may discard runtime data structure 502b.

Accordingly, the embodiments described herein enable a speculative replay of a trace of executable code, while results of a prior debugging operation are being presented at a user interface. In particular, embodiments predict one or more likely subsequent debugging operations while presenting results of a current debugging operation, and perform at least one replay while recording runtime data in a separate data structure. If the next debugging operation matches one of the predicted debugging operation, runtime results are immediately presented from the separate data structure, rather than performing the requested debugging operation while the user waits.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

Embodiments of the present invention may comprise or utilize a special-purpose or general-purpose computer system that includes computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical storage media that store computer-executable instructions and/or data structures. Physical storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud computing model can be composed of various characteristics, such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth.

Some embodiments, such as a cloud computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A method, implemented at a computer system that includes one or more processors, for performing a speculative replay of code execution, the method comprising:
   replaying trace data comprising one or more trace data streams that represent execution of one or more executable entities, including storing first runtime state of replaying the trace data in one or more first replay data structures;
   during replay of the trace data, encountering a first point of interest in the one or more executable entities;
   based at least on encountering the first point of interest, ceasing replay of the trace data, and presenting at a user interface at least a portion of the first runtime state stored in the one or more first replay data structures; and
   while presenting the portion of the first runtime state at the user interface, speculatively replaying the trace data, including:
      automatically selecting a second point of interest in the one or more executable entities;
      creating one or more second replay data structures based on the one or more first replay data structures; and
      replaying the trace data until encountering the second point of interest, including storing second runtime state of replaying the trace data in the one or more second replay data structures.

2. The method as recited in claim 1, further comprising:
   receiving a user selection of the second point of interest; and
   presenting at the user interface at least a portion of the second runtime state stored in the one or more second replay data structures.

3. The method as recited in claim 2, further comprising discarding the one or more first replay data structures.

4. The method as recited in claim 1, further comprising:
   receiving a user selection of a third point of interest other than the second point of interest; and
   discarding the one or more second replay data structures.

5. The method as recited in claim 1, wherein automatically selecting the second point of interest in the one or more executable entities comprises selecting the second point of interest based on one or more anticipated next debugger operations.

6. The method as recited in claim 5, wherein the one or more anticipated next debugger operations include one or more of a single step forward operation, a single step backward operation, a step over forward operation, a step over backward operation, a go forward operation, or a go backward operation.

7. The method as recited in claim 5, wherein the one or more anticipated next debugger operations are selected based on performing a statistical analysis of past debugger usage patterns.

8. The method as recited in claim 1, wherein creating the one or more second replay data structures based on the one or more first replay data structures comprises copying the or more first replay data structures.

9. The method as recited in claim 1, wherein creating the one or more second replay data structures based on the one or more first replay data structures comprises creating differential data structure storing differences between the first runtime state and the second runtime state.

10. The method as recited in claim 1, wherein creating the one or more second replay data structures based on the one or more first replay data structures comprises creating a copy-on-write data structure based on forking a thread corresponding to at least one of the one or more executable entities.

11. The method as recited in claim 1, wherein speculatively replaying the trace data also includes:
    automatically selecting a third point of interest in the one or more executable entities;
    creating one or more third replay data structures based on the one or more first replay data structures; and concurrent to replaying the trace data until encountering the second point of interest, replaying the trace data until encountering the third point of interest, including storing third runtime state of replaying the trace data in the one or more third replay data structures.

12. The method as recited in claim 11, further comprising:
receiving a user selection of the second point of interest;
presenting at the user interface at least a portion of the second runtime state stored in the one or more second replay data structures; and
discarding the one or more first replay data structures and the one or more second replay data structures.

13. The method as recited in claim 1, further comprising inserting one or more key frames into the trace data during replay of the trace data.

14. A computer system, comprising:
one or more processors; and
one or more computer-readable media having stored thereon computer-executable instructions that are executable by the one or more processors to cause the computer system to perform at least the following:
replay trace data comprising one or more trace data streams that represent execution of one or more executable entities, including storing first runtime state of replaying the trace data in one or more first replay data structures;
during replay of the trace data, encounter a first point of interest in the one or more executable entities;
based at least on encountering the first point of interest, cease replay of the trace data, and present at a user interface at least a portion of the first runtime state stored in the one or more first replay data structures; and
while presenting the portion of the first runtime state at the user interface, speculatively replay the trace data, including:
automatically selecting a second point of interest in the one or more executable entities;
creating one or more second replay data structures based on the one or more first replay data structures; and
replaying the trace data until encountering the second point of interest, including storing second runtime state of replaying the trace data in the one or more second replay data structures.

15. The computer system of claim 14, the computer-executable instructions also including instructions that are executable to cause the computer system to:
receive a user selection of the second point of interest; and
present at the user interface at least a portion of the second runtime state stored in the one or more second replay data structures.

16. The computer system of claim 14, the computer-executable instructions also including instructions that are executable to cause the computer system to:
receive a user selection of a third point of interest other than the second point of interest; and
discard the one or more second replay data structures.

17. The computer system of claim 14, wherein creating the one or more second replay data structures based on the one or more first replay data structures comprises at least one of:
copying the or more first replay data structures;
creating differential data structure storing differences between the first runtime state and the second runtime state; or
creating a copy-on-write data structure based on forking a thread corresponding to at least one of the one or more executable entities.

18. The computer system of claim 14, wherein speculatively replaying the trace data also includes:
automatically selecting a third point of interest in the one or more executable entities;
creating one or more third replay data structures based on the one or more first replay data structures; and
concurrent to replaying the trace data until encountering the second point of interest, replaying the trace data until encountering the third point of interest, including storing third runtime state of replaying the trace data in the one or more third replay data structures.

19. A computer program product comprising one or more hardware storage devices having stored thereon computer-executable instructions that are executable by one or more processors to cause a computer system to perform at least the following:
replay trace data comprising one or more trace data streams that represent execution of one or more executable entities, including storing first runtime state of replaying the trace data in one or more first replay data structures;
during replay of the trace data, encounter a first point of interest in the one or more executable entities;
based at least on encountering the first point of interest, cease replay of the trace data, and present at a user interface at least a portion of the first runtime state stored in the one or more first replay data structures; and
while presenting the portion of the first runtime state at the user interface, speculatively replay the trace data, including:
automatically selecting a second point of interest in the one or more executable entities;
creating one or more second replay data structures based on the one or more first replay data structures; and
replaying the trace data until encountering the second point of interest, including storing second runtime state of replaying the trace data in the one or more second replay data structures.

20. The computer program product of claim 19, the computer-executable instructions also including instructions that are executable to cause the computer system to:
receive a user selection of the second point of interest;
present at the user interface at least a portion of the second runtime state stored in the one or more second replay data structures; and
discard the one or more first replay data structures.

* * * * *